Jan. 7, 1958 L. I. PICKERT 2,819,125
COMBINED VACUUM AND PRESSURE AIR BRAKE SYSTEM
AND GRADUATING RELAY FOR USE THEREIN
Filed April 22, 1953 2 Sheets-Sheet 2

TO RES. 27

INVENTOR
Lynn I. Pickert

BY

ATTORNEYS

United States Patent Office 2,819,125
Patented Jan. 7, 1958

2,819,125

COMBINED VACUUM AND PRESSURE AIR BRAKE SYSTEM AND GRADUATING RELAY FOR USE THEREIN

Lynn I. Pickert, Watertown, N. Y., assignor to The New York Air Brake Company, a corporation of New Jersey Application April 22, 1953, Serial No. 350,361

3 Claims. (Cl. 303—4)

This invention relates to dual fluid pressure brake systems, and provides a locomotive brake equipment in which an engineer's brake valve of a type standard on American railways may control locomotive and train brakes connected with a conventional brake pipe or connected with a vacuum train line, either or both.

Where some of the cars in a train are equipped with automatic air brakes and others with vacuum brakes, it is necessary that the cars be equipped both with a brake pipe and a vacuum line and when this is the case, cars equipped with different brakes of the two types may be mixed in one train.

The invention provides simple relay valves which may be used to control pressures in a vacuum train pipe in response to changes of pressure in the brake pipe of an automatic air brake system.

A locomotive equipped according to the invention has a brake pipe for automatic air brakes, a vacuum train pipe for vacuum brakes, a main reservoir with compressor and the usual compressor controls, and a vacuum reservoir with exhauster and appropriate controls therefor.

The relays provided according to the invention are piloted by brake pipe pressure, act to change vacuum train pipe pressure and lap in response to that change. The preferred form of relay makes use of a single piston valve and includes loading means whose effect is modified by changes in the setting of the feed valve.

Successful embodiments of the invention are illustrated in the accompanying drawings in which.

Figure 1:
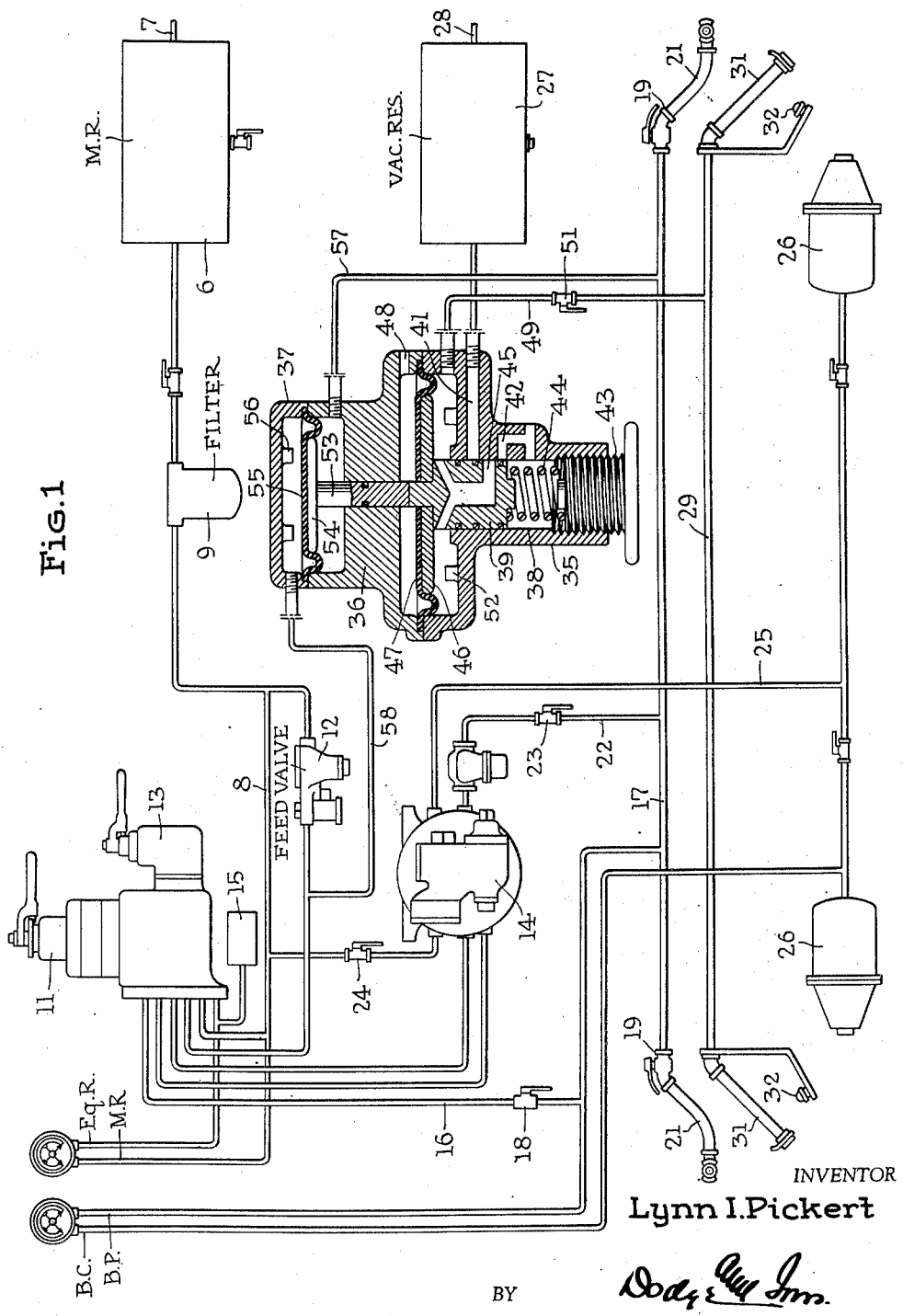
Figure 1 is an elevation somewhat diagrammatic in character showing the basic system components for a locomotive with the relay valve drawn in axial section on an enlarged scale.

Reference should first be made to Figure 1 which shows a conventional locomotive equipment conforming generally to standard American practice. It will therefore be necessary merely to identify the basic components which are too familiar to require detailed description.

The main reservoir 6 is supplied with compressed air through the pipe 7 by compressor, which is not shown. This compressor is controlled in any usual manner. The main air line 8 leads from the main reservoir through a filter 9 to the engineer's brake valve indicated generally by the numeral 11. This desirably is of the equalizing discharge type and has connected thereto an equalizing reservoir 15. There is the usual connection from the pipe 8 to the engineer's brake valve 11 through the feed valve 12. The pipe 8 also supplies air to the independent brake valve indicated generally by the numeral 13, the connection being through the mount which supports the engineer's brake valve 11. There is also a connection to the distributing valve 14.

The engineer's brake valve 11 is connected by a branch pipe 16 with the brake pipe 17 which extends from end to end of the locomotive and has at each end an angle cock 19 and coupling hose 21. The double-heading cock 18 is interposed in the branch pipe 16 as usual. The pipe 22 with cut-out cock 23 connects the brake pipe 17 with the distributing valve 14. A cut-out cock 24 is interposed in the connection between the main reservoir pipe 8 and the distributing valve 14. The distributing valve is connected by the pipe 25 with locomotive brake cylinders 26.

Other familiar automatic air brake connections are shown on the drawing but are common in the art and require no detailed description. Some of them, notably the gage connections are identified by legends.

So far the description has dealt with the automatic air brake part of the system. In addition to this, there is certain vacuum brake equipment now to be described.

There is a vacuum reservoir 27 which is evacuated by the usual exhauster connected at 28 and controlled in any ordinary way. The vacuum train line 29 extends the length of the locomotive and has at each end a coupling hose 31 for connection to the vacuum train line of an adjacent car. Each hose terminates in a conventional vacuum coupling which, when not in use, is sealed by plug 32 conventionally mounted on a bracket, as shown.

The control valve is shown connected into the brake system of Figure 1, but is drawn on an enlarged scale to permit illustration of its construction which involves the really significant novel features of the invention.

The body of the valve comprises three main components, a valve-seat portion 35, a motor housing portion 36 and a cap 37. The portion 35 has an axial bore 38 which is the seat for a piston valve 39, shown as equipped with piston rings to improve its sealing qualities.

The seat has an evacuating port 41 connected directly with the vacuum reservoir and an atmospheric port 42 which has a branch effective continuously to vent that portion of bore 38 which is below valve 39. The space must be vented but the arrangement adopted is a matter of choice.

Threaded into the lower end of bore 38 is an adjustable spring seat 43 for the coil compression spring 44. Adjustment of the seat determines the pressure maintained in the vacuum train line 29 under running conditions. The valve 39 is shown in its lap position in which the controlling port 45 is between ports 41 and 42 and blanked by the seat. The upper end of the valve 39 is reduced in diameter, affording a neck and shoulder on which is fixed a thrust disc 46 for diaphragm 47. The margin of diaphragm 47 is clamped between housing parts 35 and 36. The space above the diaphragm is vented to atmosphere at 48 and the space below the diaphragm is connected with vacuum train pipe 29 by branch 49 controlled by the normally open cock 51. This space is always in free communication with valve port 45, as is clearly indicated in the drawings. Stop lugs 52 limit downward motion of disc 46 and its related diaphragm.

The member 36 has a guideway coaxial with bore 38 and this receives a reciprocable stem 53 sealed by an O-ring and carrying a disc-shaped head 54 underlying diaphragm 55. The margin of diaphragm 55 is clamped between parts 36 and 37 and the stem 53 is in thrust engagement with the neck portion of valve 39. Upward motion of the stem is limited by lugs 56.

The space below diaphragm 55 is in free communication with the automatic air brake pipe 17 at all times by way of branch 57. The space above the diaphragm is connected by branch 58 with the discharge connection of the adjustable feed valve 12.

Feed valve pressure acting downward on diaphragm 55 develops the necessary biasing load on valve 39. The spring 44 does not perform this loading function and in fact opposes the load just mentioned. Spring 44 is primarily for the purpose of controlling pressure in the vacuum train line under running (brakes released) conditions.

The use of feed valve pressure for loading has important consequences. Most automatic air brake systems have adjustable feed valves, such as 12, and these valves are adjusted from time to time to modify the operation of the systems, higher pressures being desirable where the gradients are heavy.

With the arrangement here described adjustment of the feed valve does not derange the correlation between the automatic air brake system and the vacuum system, because the change of feed pressure changes the loading of the relay valve harmoniously.

This desirable feature is not included in the valve of Figure 2 which will now be described. Except for this feature the Figure 2 construction has analogs for the components of the Figure 1 construction, but the valve is of such different form that the analogy cannot be followed very closely in the description. It is connected into the system in the same general way.

The housing comprises three mating parts 61, 62, and 63 subdivided by flexible diaphragms 64, 65 and 66 (whose peripheries are clamped between the mating parts) into four spaces. The centers of the three diaphragms are connected to move in unison by a ported structure which carries valve parts.

A hub 67 has a stem 68 which is shouldered as shown and extends upward through the centers of all three diaphragms. A nut 69 clamps the central portion of the largest diaphragm 64 to the hub 67. The center of the smallest diaphragm 65 is held between a shoulder in stem 68 and the lower end of a spacer sleeve 71, whose upper end engages the center of diaphragm 66. A plate 72 and nut 73 threaded on the upper end of stem 68 complete the assembly. The diaphragm 66 is larger than diaphragm 65 and smaller than diaphragm 64.

The housing member 63 has an internally threaded opening at its top into which is screwed an adjustable spring seat 74 for the loading spring 75. This reacts downward on plate 72. A locking nut for the spring seat is shown at 76. The space above diaphragm 66 is vented to atmosphere by port 77.

The space between diaphragm 66 and diaphragm 65 is connected with the brake pipe by branch 57 (see Figure 1). The space between diaphragm 65 and diaphragm 64 is vented to atmosphere at 78. The space below diaphragm 64 is connected with the vacuum train pipe 29 by branch 49 (see Figure 1.)

The valve mechanism proper is all related to and all but one of its components are carried by the hub 67. Hub 67 is shaped as an inverted cup whose lower margin is internally threaded.

A fixed annular valve seat is afforded by a tube 79 seated in an opening at the center of the bottom wall of housing part 61. Its interior is connected by pipe 81 with vacuum reservoir 27. An annular nut 82 is threaded into the lower portion of hub 67 and carries an upward presented seat rim 83, which is coaxial with and passes above and below the upper rim of the tube 79 as the diaphragm 64 shifts up and down. This has the effect of causing a floating rubber-like disc valve 84 to close against one or the other or both of said seats.

A metal insert 85 in the valve stiffens the valve and affords marginal stand-off lugs which center the valve. The space above valve 84 is vented to atmosphere through the bore 86 and communicating cross bores which lead to the space between diaphragms 64, 65 and consequently to vent 78. The wall above the valve 84 is cross-slotted so that the valve can never close bore 86.

Since one system of brakes operates above the atmospheric line and the other below it discussion in terms of absolute pressure is logical and avoids much confusion.

Under the usual American practice an automatic air brake system operates at 70 p. s. i. gage (84.7 p. s. i. absolute) and full equalization (full service application) is about 45 p. s. i. gage (59.7 absolute). In an ordinary vacuum brake system the brake pipe is at 18″ to 20″ Hg or about 5 p. s. i. absolute under "release and running conditions" but is at atmospheric pressure to cause a full application. The function of the valves above described is to respond to changes of brake pipe pressure between 70# gage and 45# gage to establish in the vacuum train pipe changes between 5# absolute and 14.7# absolute. The diaphragm areas and the loading are worked out on that basis and when this condition is established good graduation is had between the stated values.

In the valves of both figures the absolute brake pipe pressure and the absolute train pipe pressure work concurrently and urge the valve in the direction to cause evacuation of the vacuum train pipe.

The loading opposes this. In Figure 1 the pressure above diaphragm 55 does the loading and varies directly with normal brake pipe pressure, which is determined by the adjustment of feed valve 12. Adjustment of spring 44, which opposes the loading effected by diaphragm 55, determines the degree of vacuum maintained in train line 29 under running conditions.

Thus a reduction of brake pipe pressure causes a related rise of vacuum train line pressure and each entails application of the brakes connected thereto, so that the two systems operate in harmony.

Figure 2:
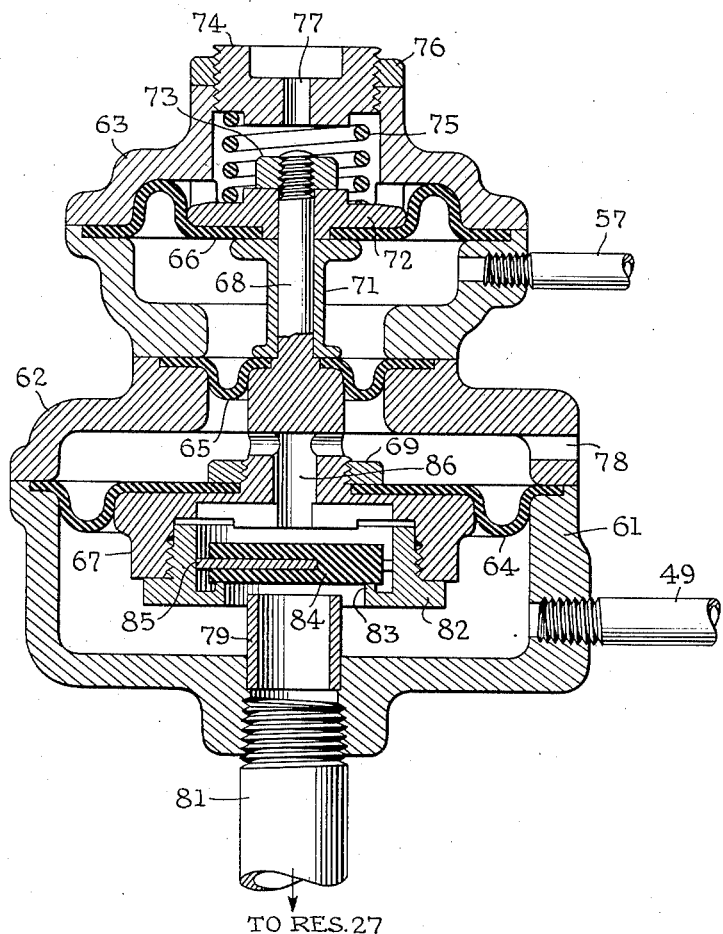
Figure 2 is an axial section of a modified form of relay valve.

In Figure 2 the spring 75 develops the loading force. It replaces diaphragm 55 and the opposed adjustable spring 44. Its stress must be readjusted if the feed valve 12 is adjusted. That is why the spring seat 74 is adjustable.

The piston valve 39 has good graduating characteristics and its stability is enhanced because it has some range of motion while lapping both ports 41 and 42.

The valve 84 graduates, but not so smoothly because only a line position divides its departure from seat 79 and seat 83, a condition not entirely favorable to stability though tolerable.

Just as is the case with the apparatus of Fig. 1, the device of Fig. 2 causes vacuum train line pressure to vary as brake pipe pressure varies, but in the reverse sense.

What is claimed is:

1. The combination of an automatic air brake equipment for a locomotive said equipment including a source of compressed air, a brake pipe, an engineer's brake valve and a feed valve supplied by said source and controlling pressure in the brake pipe; a vacuum brake equipment including an evacuated chamber and a vacuum train pipe; a controlling valve unit shiftable in relatively reverse directions to connect the vacuum train pipe selectively with said evacuated chamber and with atmosphere, said controlling valve unit having an intermediate position in which both said connections are closed; pressure motor means comprising a housing enclosing a plurality of working spaces, one connected with the brake pipe and another with the vacuum train pipe, and movable abutments which differ in area and form movable walls of respective working spaces, said abutments being mechanically related to said controlling valve unit to shift the same, the absolute pressure in the brake pipe and the absolute pressure in the vacuum train pipe acting concurrently on corresponding abutments to shift said controlling valve unit in the direction to connect the evacuated chamber; and mechanically related pressure motor means energized by said feed valve and serving to load said controlling valve unit in the opposite direction.

2. The combination of an automatic air brake equipment for a locomotive said equipment including a source of compressed air, a brake pipe, an engineer's brake valve and an adjustable feed valve supplied by said source and controlling pressure in the brake pipe; a vacuum brake equipment including an evacuated chamber and a vacuum train pipe; a piston valve shiftable in reverse directions from a lap position in which it isolates the vacuum train pipe from both atmosphere and said evacuated chamber, to positions in which, selectively, it connects said train pipe with the evacuated chamber or with atmosphere; pressure motor means comprising a housing enclosing a plurality of working spaces, one connected with the brake pipe and another with the vacuum train pipe, and movable abutments which differ in area and form movable walls of respective working spaces, said abutments being mechanically related to said piston valve to shift the same, the absolute pressure in the brake pipe and the absolute pressure in the vacuum train pipe acting concurrently on corresponding abutments to shift the piston valve in the direction to connect the evacuated chamber; and mechanically related pressure motor means energized by said feed valve and serving to load said piston valve in the opposite direction.

3. The combination of an automatic air brake equipment for a locomotive said equipment including a source of compressed air, a brake pipe, an engineer's brake valve and an adjustable feed valve supplied by said source and controlling pressure in the brake pipe; a vacuum brake equipment including an evacuated chamber and a vacuum train pipe; a piston valve shiftable in reverse directions from a lap position in which it isolates the vacuum train pipe from both atmosphere and said evacuated chamber, to respective positions in which, selectively, it connects said train pipe with the evacuated chamber or with atmosphere; pressure motor means comprising a housing enclosing a plurality of working spaces, one connected with the brake pipe and another with the vacuum train pipe, and movable abutments which differ in area and are subject to pressures in respective working spaces, said abutments being mechanically related to said piston valve to shift the same, the absolute pressure in the brake pipe and the absolute pressure in the vacuum train pipe acting concurrently on corresponding abutments to shift the piston valve in the direction to connect the evacuated chamber; mechanically related pressure motor means energized by said feed valve and serving to load said piston valve in the opposite direction; and adjustable spring means serving to impose a bias on said piston valve sufficient to modify the pressure maintained in said vacuum train line under full release conditions.

References Cited in the file of this patent

UNITED STATES PATENTS

| | | |
|---|---|---|
| 1,943,574 | Winter | Jan. 16, 1934 |
| 2,314,397 | Hewitt | Mar. 23, 1943 |